United States Patent [19]

Coué

[11] Patent Number: 4,529,395

[45] Date of Patent: Jul. 16, 1985

[54] CRANK-GEAR DERAILLEUR

[75] Inventor: Maurice E. L. Coué, Feucherolles, France

[73] Assignee: Huret et ses Fils, Nanterre, France

[21] Appl. No.: 451,270

[22] Filed: Dec. 20, 1982

[30] Foreign Application Priority Data

Dec. 23, 1981 [FR] France .............................. 81 24125

[51] Int. Cl.³ .............................................. F16H 9/00
[52] U.S. Cl. .................................................... 474/82
[58] Field of Search ............................. 474/82, 101, 80

[56] References Cited

U.S. PATENT DOCUMENTS 4,199,997 4/1980 Isobe ...................................... 474/82

FOREIGN PATENT DOCUMENTS 1090386 3/1955 France .................................. 474/80
2380938 10/1978 France .................................. 474/82
 616877 1/1949 United Kingdom ................. 474/82

Primary Examiner—Stephen J. Novosad
Assistant Examiner—Frank H. McKenzie, Jr.
Attorney, Agent, or Firm—Trexler, Bushnell & Wolters, Ltd.

[57] ABSTRACT

The derailleur comprises, between the conventional articulation mechanism which allows the lateral displacement of the chain guide device (12), an additional articulation mechanism (10, 11) whereby the chain guide device (12) can effect a displacement which is substantially free and of large extent in a plane perpendicular to the axis (X—X) of the crank-gear. This very substantially improves the conditions under which the chain is shifted from one chain wheel to another.

15 Claims, 4 Drawing Figures

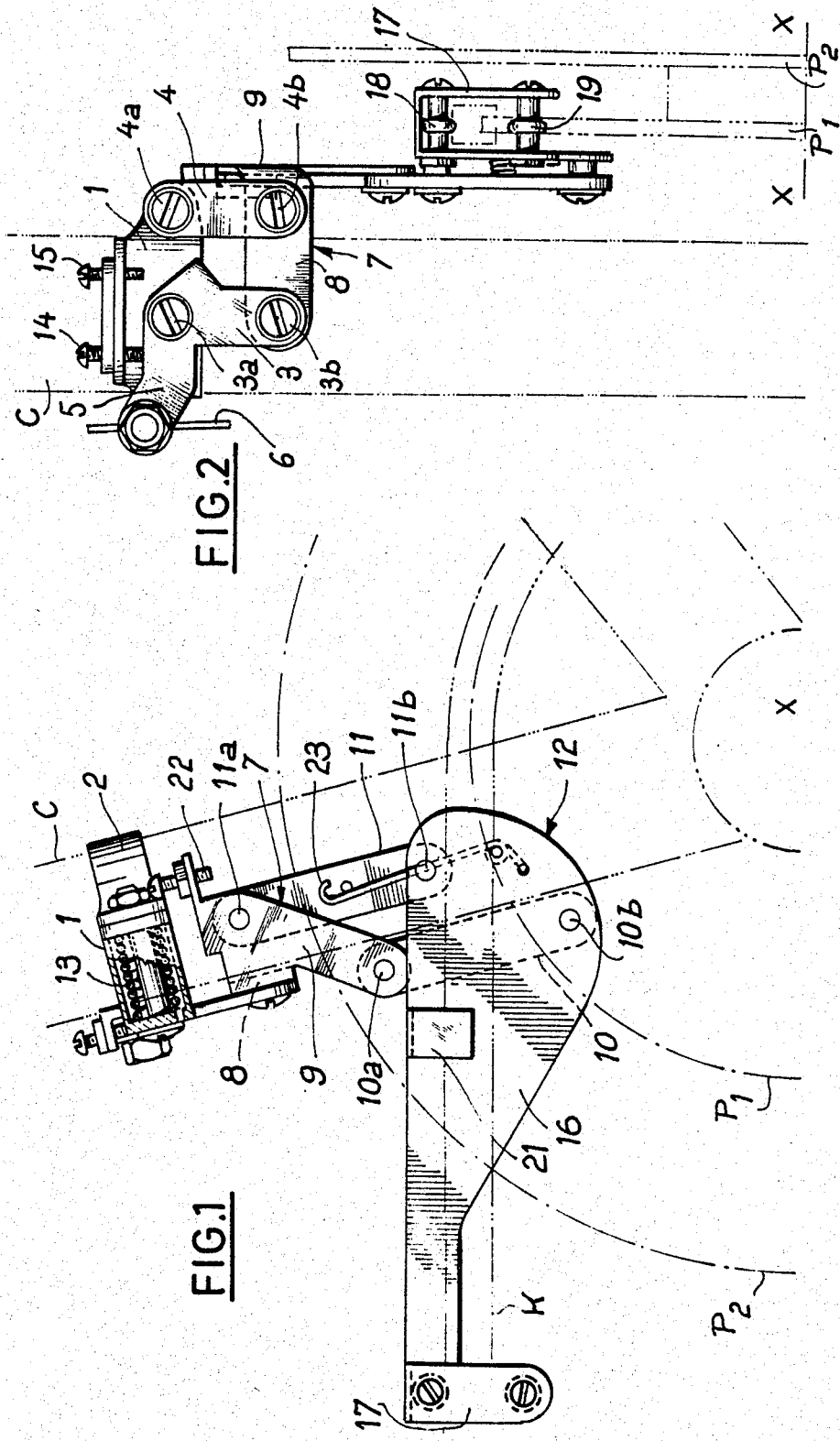

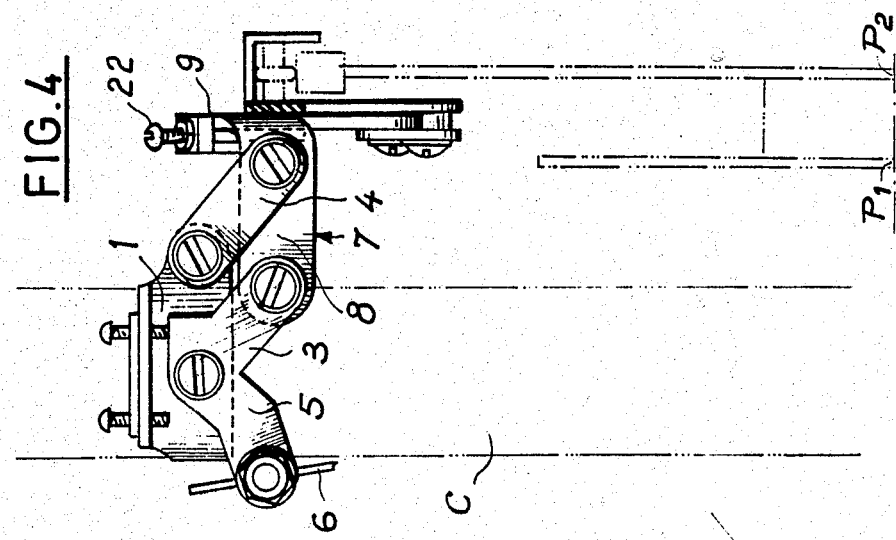
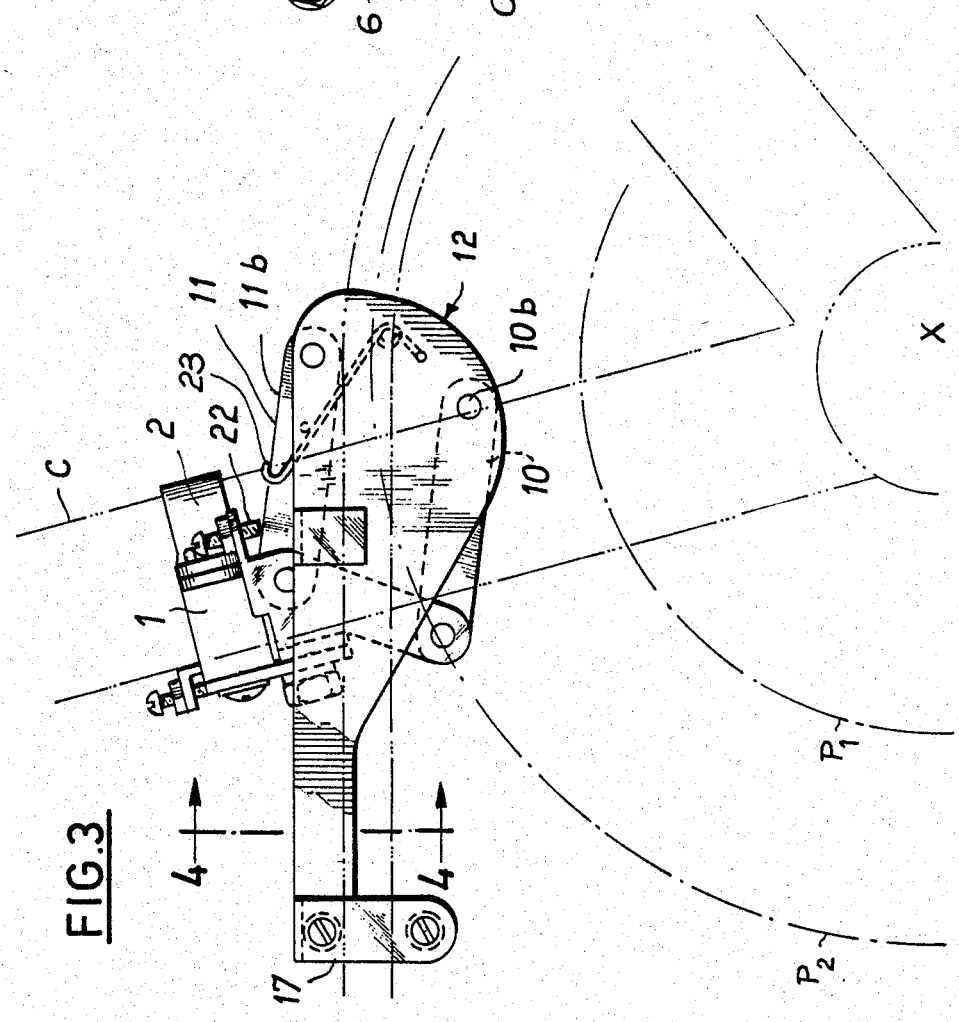

CRANK-GEAR DERAILLEUR

The present invention relates to front derailleurs or crank-gear derailleurs for cycles.

These derailleurs, which are employed for shifting the chain from one chain wheel of the crank-gear to another, generally comprise chain-guide means in the form of a fork element whose two branches, which are disposed on each side of the upper reach of the chain, extend in a direction parallel to the latter, this fork element being connected to a support, secured to the frame of the cycle, by an articulated mechanism adapted to permit a displacement of the fork element in translation in a direction contained in a plane which is roughly parallel to the axis of the crank-gear, under the action of control means, such as a cable actuated by the user. This mechanism may comprise an articulated parallelogram structure of which the support and a tab carried by the fork element constitute two opposed sides interconnected by two links. The actuating means is usually hooked to an extension of one of these links and elastically yieldable means are provided for biasing the fork element to the position thereof in which the chain is on the smaller chain wheel located on the inside of the crank-gear relative to the frame of the cycle.

It will be understood that other mechanisms equivalent to, or similar to, an articulated parallelogram structure and permitting the required displacement of the fork element for shifting the chain between the chain wheels may be disposed between the fork element and its support.

However, in all these known arrangements, the amplitude of the vertical displacement of the fork element is very small and this has for consequence to limit the possible difference between two chain wheels carried by the crank-gear.

Further, the conditions of the shifting of the chain are not satisfactory. First of all, when the fork element abuts laterally against the chain, large forces are produced in the fork element, the chain and the chain wheel, and the last two elements are made to deform under the effect of these lateral forces. Furthermore, when raising the chain from a small chain wheel to a large chain wheel, the fork element comes in contact with the chain by its rear part so that the shifting of the chain is not effected in a positive manner and unpleasant chain noises are produced.

An object of the invention is to overcome these drawbacks and to provide a front derailleur in which the conditions of shifting the chain from one chain wheel to the other are very substantially improved.

The invention therefore provides a front derailleur or crank-gear derailleur for a cycle, of the type comprising a guide means for the chain, connected to the frame of the cycle by an articulated mechanism adapted to permit a displacement of said guide means in a direction contained in a plane which is roughly parallel to the axis of the crank-gear, said guide means coming into lateral contact with the chain when shifting the chain from one chain wheel to the other, wherein the articulated mechanism is adapted to permit also a displacement of the guide means in a plane roughly perpendicular to the axis of the crank-gear.

According to one embodiment: this mechanism comprises an articulated parallelogram structure, the component parts of which are disposed in a plane perpendicular to the axis of the crank-gear;

elastically yieldable means are provided for biasing said guide means to its lower position;

at least one stop is provided for limiting the travel of said guide means when it is displaced in a plane perpendicular to the axis of the crank-gear;

said guide means carries in its rear part a roller or like means which cooperates with the upper part of the upper reach of the chain.

The invention will be described in more detail with reference to the accompanying drawing which is given merely by way of example and in which:

FIG. 1 is a side elevational view, with a part cut away, of a front derailleur according to the invention, the chain being placed on the small chain wheel;

FIG. 2 is a rear elevational view of this mechanism;

FIG. 3 is a view similar to FIG. 1 of the derailleur in the position in which the chain is placed on the large chain wheel, and FIG. 4 is a sectional view taken on line 4—4 of FIG. 3.

The derailleur according to the invention comprises a support 1 which is fixed by a semi-collar 2 to the frame C of a cycle. Pivotally mounted on the support 1 at 3a, 4a are two links 3, 4. The link 3 is extended so as to form a lever 5 on which the end of an actuating cable 6 is secured. At their two opposed ends the links 3, 4 are articulated at 3b, 4b on an intermediate support 7 formed, in the presently described embodiment, by a metal member folded into an L-shape. One of the branches 8 of this member constitutes with the support 1 and the two links 3, 4 an articulated parallelogram structure contained in a plane roughly parallel to the axis X—X of the crank-gear. The other branch 9 of this member 7 constitutes one of the sides of a second articulated parallelogram structure which is contained in a plane roughly perpendicular to the axis X—X of the crank-gear and which is completed by two links 10 and 11 which are articulated at one end at 10a, 11a to the member 7 and at their opposite ends at 10b, 11b to a guide means 12 for the chain. The link 10 is articulated to the guide means 12 in the vicinity of the lower edge of the latter and the link 11 is articulated to the guide means 12 in the vicinity of the upper edge thereof. The branch 9 of the second parallelogram structure is very inclined to the vertical and makes for example an angle less than 30° with the vertical so that the amplitude of the vertical displacement of the means 12 may be large.

Conventionally, a return spring 13 for returning the derailleur to the position which corresponds to the engagement of the chain with the small chain wheel, is incorporated in the support 1 as shown in FIG. 1. Further, provided on the same support are adjustable stops 14, 15 which determine the end positions of the first articulated parallelogram structure.

The chain guide means 12 comprises mainly a plate 16 of metal or other sufficiently strong suitable material, this plate including a front portion of sufficiently large extent in height to permit the articulation of the two links 10 and 11, the vertical extent of this plate being substantially reduced toward its rear part. At its rear end, the plate 16 is completed by a fork element 17 constituted by a formed-over tab having two branches between which are disposed two rollers 18, 19 of an anti-friction material which are maintained, for example, by screw-and-nut means or other suitable means. Further, in its intermediate upper part, the plate 16 carries a folded tab 20 which may be in one piece there-with and formed over so as to define a wing 21 parallel to the plate 16.

The intermediate support 7 carries a stop screw 22 which cooperates with the upper edge of the link 11 so as to determine the upper position of this plate. Also provided between the link 11 and the plate 16 is a small return spring 23 which biases the guide means towards its lower position shown in FIGS. 1 and 2.

In the presently-described embodiment, this derailleur is employed with a crank-gear comprising two chain wheels, namely a small chain wheel $P_1$ having, for example, thirty-four teeth, and a large chain wheel $P_2$ having for example fifty teeth. In the drawings, these chain wheels and the frame C and the chain K are shown in dot-dash lines.

The derailleur just described operates in the following manner:

In starting at the position shown in FIGS. 1 and 2, in which the chain K is engaged on the small chain wheel $P_1$, if the user pulls on the actuating cable, the first parallelogram structure 1, 3, 4, 8 is deformed and moves away from the frame the assembly comprising the second parallelogram structure 9, 10, 11, 12 of which the chain guide means 12 forms a part. After a certain travel, the plate 16 comes into lateral contact with the chain and, under the effect of friction between the chain and the plate, the latter is driven upwardly and this deforms the second parallelogram structure. In this second part of the movement, the chain guide means undergoes therefore a complex movement in translation which results from the simultaneous deformation of the two parallelogram structures disposed in two planes which are perpendicular, or roughly perpendicular, to each other.

Owing to the presence of the second parallelogram structure which enables the guide means 12 to move upwardly and accompany the displacement of the chain, the lateral forces which are produced in a conventional device are very substantially attenuated. In this way, there is avoided a deformation of the chain and of the chain wheel and there is obtained a much more definite, rapid and silent shifting of the chain from one chain wheel to the other. This result is still further improved by the fact that the device enables the chain to be acted upon in a position substantially closer to the teeth and in fact at a distance from the teeth corresponding to a pitch of a link of the chain.

The invention also permits ensuring a correct shifting of the chain between two chain wheels having very different numbers of teeth.

It will be understood that a similar operation is achieved when it is desired to shift the chain from the large chain wheel $P_2$ to the small chain wheel $P_1$. It is then the tab 21, which is located slightly to the rear of the circle of the teeth of the large chain wheel, which comes in contact with the chain and which guides the latter toward the small chain wheel while accompanying the chain in its downward movement.

Note that the presence of the small return spring 23 is optional, since the chain guide means may resume its lower position merely under the effect of its weight.

Further, the invention is applicable irrespective of the manner in which the articulation mechanism producing the lateral displacement of the guide means in a plane parallel to the axis of the crank-gear is arranged. Likewise, modifications may be made in the design of the articulation mechanism between the guide means and the intermediate support 7 and in the design of the guide means itself, without departing from the scope of the invention defined in the accompanying claims.

Having now described my invention what I claim as new and desire to secure by Letters Patent is:

1. A front derailleur or a derailleur for a crank-gear of a cycle having a frame, said derailleur comprising a support for fixing on said frame, a chain guide means, an articulated mechanism connecting the chain guide means to said support and permitting in chain-shifting operation of the derailleur a complex displacement of said guide means which has a first component in a direction parallel to a first plane substantially parallel to an axis of rotation of the crank-gear when said support is in a fixed position on said frame of the cycle, said guide means being capable of coming into lateral contact with the chain when shifting the chain from one chain wheel to another chain wheel of the crank-gear, said complex displacement permitted by said articulated mechanism in chain-shifting operation of the derailleur also having a second component in a direction parallel to a second plane substantially perpendicular to said first plane when said support is in a fixed position on said frame of the cycle, the articulated mechanism comprising an intermediate support means, first articulation means connecting the intermediate support means to the support and second articulation means connecting the intermediate support means to the chain guide means, said first and second articulation means comprising articulations which are freely operative in operation of the derailleur.

2. A derailleur according to claim 1, wherein the intermediate support means is L-shaped and comprises two branches which are respectively substantially parallel to and substantially orthogonal to said axis of rotation of the crank-gear when the support is in fixed position on the frame of the cycle.

3. A derailleur according to claim 1, wherein the second articulation means constitutes an articulated parallelogram structure having component members which are disposed in said second plane.

4. A derailleur according to claim 2, wherein the second articulation means constitutes an articulated parallelogram structure having component members which are disposed in said second plane.

5. A derailleur according to claim 1, comprising elastically yieldable means combined with the chain guide means for biasing the chain guide means toward a lower position thereof.

6. A derailleur according to claim 1, comprising elastically yieldable means combined with the chain guide means for biasing the chain guide means toward a lower position thereof.

7. A derailleur according to claim 1, comprising at least one stop cooperative with the chain guide means for limiting the travel of the chain guide means in respect of said second component of said complex displacement.

8. A derailleur according to claim 1, comprising at least one stop cooperative with the chain guide means for limiting the travel of the chain guide means in respect of said second component of said complex displacement.

9. A derailleur according to claim 1, wherein said guide means carries, in a rear part thereof, rolling means which cooperates with an upper part of an upper reach of the chain when the support is mounted on the frame of the cycle.

10. A derailleur according to claim 1, wherein said guide means carries, in a rear part thereof, rolling means which cooperates with an upper part of an upper reach of the chain when the support is mounted on the frame of the cycle.

11. A derailleur according to claim 1, wherein the chain guide means comprises a plate carrying, in a rear part thereof and in an intermediate part thereof, two formed-over tabs constituting fork elements in which the chain is disposed when the support is mounted on the frame of the cycle.

12. A derailleur according to claim 1, wherein the chain guide means comprises a plate carrying, in a rear part thereof and in an intermediate part thereof, two formed-over tabs constituting fork elements in which the chain is disposed when the support is mounted on the frame of the cycle.

13. A derailleur according to claim 11, wherein the rear fork element carries two rollers, between which rollers the chain passes.

14. A derailleur according to claim 12, wherein the rear fork element carries two rollers, between which rollers the chain passes.

15. A front derailleur or a derailleur for a crank-gear of a cycle having a frame, said derailleur comprising a support for fixing on said frame, a chain guide means, an articulated mechanism connecting the chain guide means to said support and permitting in chain-shifting operation of the derailleur a complex displacement of said guide means which has a first component in a direction parallel to a first plane substantially parallel to an axis of rotation of the crank-gear when said support is in a fixed position on said frame of the cycle, said guide means being capable of coming into lateral contact with the chain when shifting the chain from one chain wheel to another chain wheel of the crank-gear, said complex displacement permitted by said articulated mechanism in chain-shifting operation of the derailleur also having a second component in a direction parallel to a second plane substantially perpendicular to said first plane when said support is in a fixed position on said frame of the cycle, said articulated mechanism comprising a first articulated parallelogram structure contained in said first plane, a second articulated parallelogram structure contained in said second plane, an intermediate support means, said first parallelogram structure connecting said support to said intermediate support means and said second parallelogram structure connecting the intermediate support means to the chain guide means.

* * * * *